Patented Jan. 11, 1927.

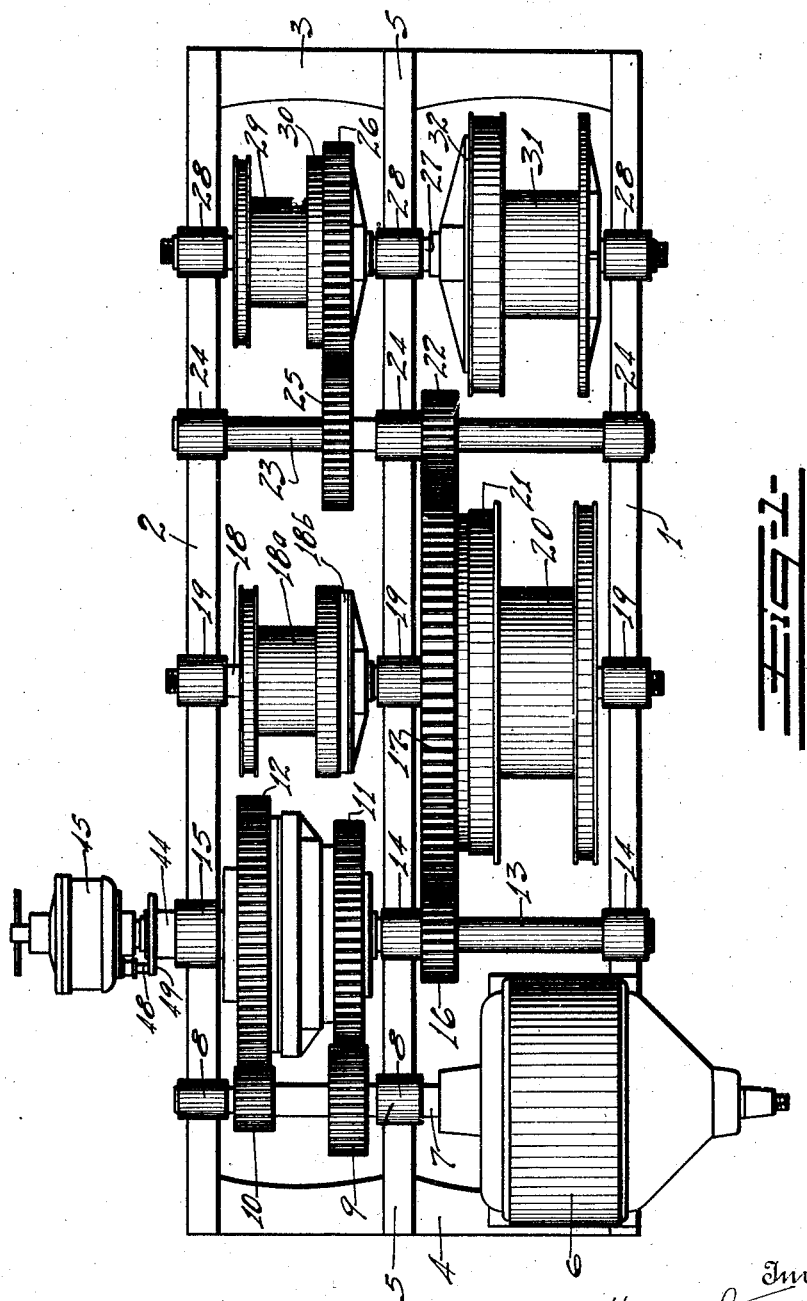

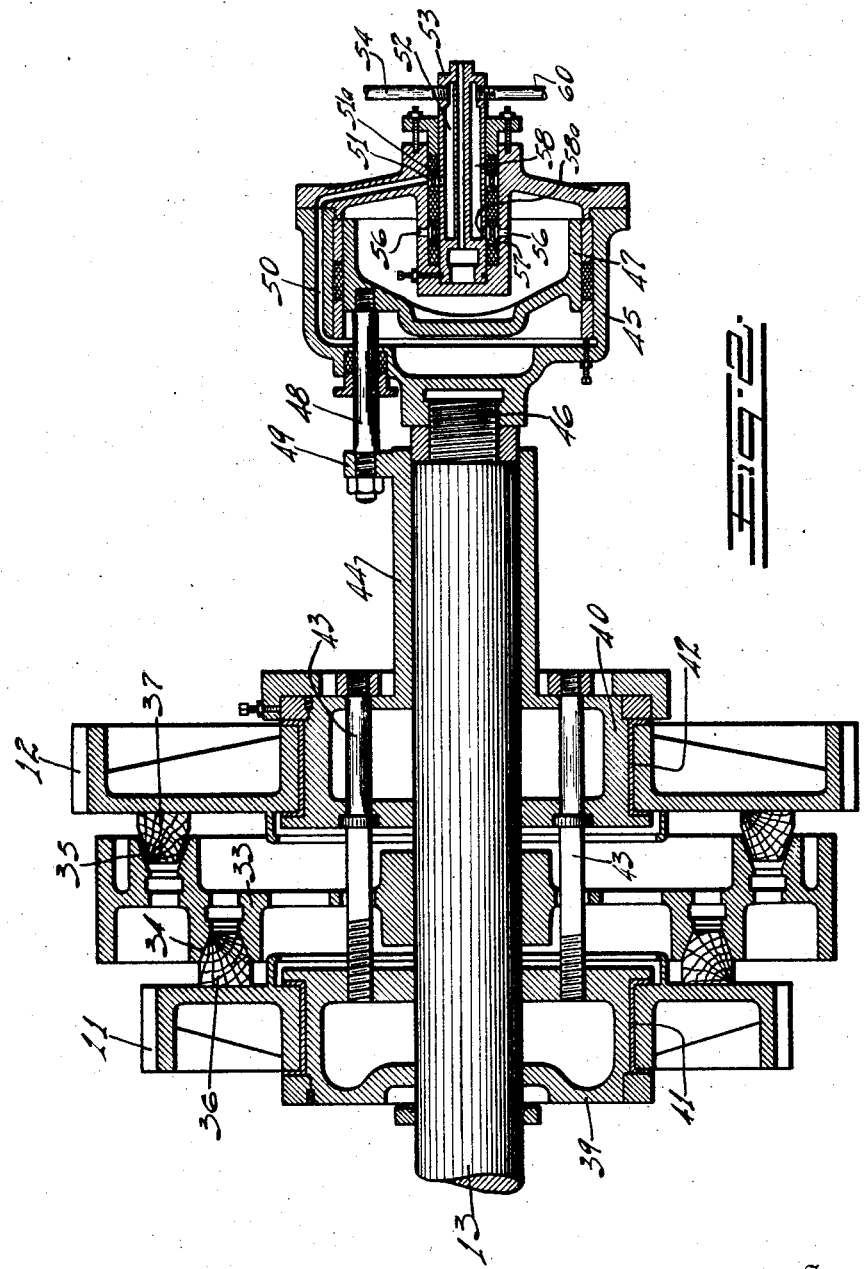

1,614,329

UNITED STATES PATENT OFFICE.

HARRY L. TURNEY, OF PORTLAND, OREGON.

LOGGING ENGINE.

Application filed September 28, 1923. Serial No. 665,341.

This invention is designed to improve hoisting or logging engines, particularly such engines as are driven by an electric motor. One of the problems of such a structure is the reduction of the speed of the motor to the drums together with means for changing the speed of the drums combined with a convenient and compact structure. The object of the present invention is to form such a logging engine.

The invention is illustrated in the accompanying drawings as follows:—

Fig. 1 shows a plan view of the engine.

Fig. 2 a sectional view of the speed changing device.

The frame is made up of the side beams 1 and 2, end beams 3 and 4 and a central longitudinal beam 5. An electric motor 6 is arranged between the beams 1 and 5 at one end of the frame and has its rotor shaft 7 journaled in bearings 8—8 on the beams 2 and 5. Gears 9 and 10 differing in diameter are fixed on the shaft 7 and mesh with gears 11 and 12 carried on an intermediate shaft 13. The shaft is journaled in bearings 14 on the beams 1 and 5 and in a bearing 15 in a manner hereinafter described. A gear 16 is fixed on the shaft 13 between the beams 1 and 5 and meshes with a gear 17 preferably fixed on a main drum shaft 18. The shaft 18 is journaled in bearings 19 on the beams 1, 5 and 2. A main drum 20 is arranged on the shaft 18 between the beams 1 and 5 and is operated through a clutch mechanism 21 between the gear 17 and the drum.

An auxiliary drum 18ª is mounted on the main drum shaft and operated through a clutch mechanism 18ᵇ.

A trip line intermediate shaft 23 is mounted in front of the main drum in bearings 24 on the longitudinal beams of the frame. A gear 22 is fixed on the shaft and meshes with the gear 17. A gear 25 is fixed on the shaft 23 between the beams 2 and 5 and meshes with a gear 26 on a trip line drum shaft 27. The shaft 27 is journaled in bearings 28 on the longitudinal beams. An auxiliary drum 29 is mounted on this shaft and operated through a clutch 30 from the gear 26. A trip line drum 31 is also mounted on this shaft between the beams 1 and 5 and operated by a clutch 32 from the shaft 27.

The gears 11 and 12 form part of a speed changing device. A driver 33 is fixed on the shaft 13 between the gears and has the opposing cone clutch surfaces 34 and 35 which operate in connection with clutch elements 36 and 37 respectively carried on the gears 11 and 12. The gear 11 is mounted on a bushing 39 and the gear 12 on a bushing 40. The bushings are provided with bearings 41 and 42 respectively which permit the rotation of the gears on the bushings but prevent axial movement thereon. These bushings are connected by pins 43. A sleeve 44 extends from the bushing 40 along the shaft and through a bearing 15, the bearing 15, therefore, forming a bearing by way of the sleeve for the shaft 13 on the beam 2. A cylinder 45 is screwed on to a screw-threaded end 46 of the shaft 13. A piston 47 is arranged in the cylinder and connected by pins 48 with a flange 49 on the sleeve 44. A port 50 communicates through a ported ring 51 and port 51ª with a chamber 52 in a nozzle 53. A pipe 54 leads from the chamber 52 and is adapted to deliver steam by way of the chamber and the ports described to the inner end of the cylinder. The outer end of the cylinder communicates through a port 56, ported ring 57 and port 58ª with a chamber 58 arranged in the nozzle 53. A pipe 60 communicates with the chamber 58 and steam is conveyed from this pipe 60 by way of the chamber, port 58ª, ported ring 57 and port 56 to the outer end of the cylinder. Proper controlling valves (not shown) are provided for the pipes 54 and 60 so that either the gear 11 or 12 may be thrown into engagement with the driver and the shaft 13 driven in accordance with the speed incident to the gear engaged.

The invention, as it will be seen, makes a very compact structure in that the speed changing device overlaps the motor longitudinally of the frame and the main drum which must of necessity be very large overlaps the speed changing device and the continuation of the drum shaft permits of an auxiliary drum in front of the speed changing device. The trip line drum and auxiliary drums in front may be carried out as desired. The connection up to the main line drum is of particular importance in that it is here that the particular strain is given to the engine and compactness is a matter of great consideration.

What I claim as new is:—

1. In a logging engine, the combination of a frame having side beams and an intermediate beam; an electric motor arranged between two of the beams having a rotor shaft extension between the other beams; an intermediate shaft parallel with the rotor shaft; a speed changing device mounted on the intermediate shaft between the beams in front of the rotor shaft extension; gears of different diameters connecting the rotor shaft extension with the speed changing device; a main drum shaft mounted in front of the intermediate shaft; a main drum mounted on the main drum shaft between the side beam and the intermediate beam in front of the electric motor; a gear connection between the main drum shaft and the intermediate shaft; a driving connection between the main drum shaft and drum; an auxiliary drum on the main drum shaft between the beams in front of the speed changing device; and means for driving said auxiliary drum from the main drum shaft.

2. In a logging engine, the combination of a frame having side beams and an intermediate beam; an electric motor arranged between two of the beams having a rotor shaft extension between the other beams; an intermediate shaft parallel with the rotor shaft; a speed changing device mounted on the intermediate shaft between the beams in front of the rotor shaft extension; gears of different diameters connecting the rotor shaft extension with the speed changing device; a main drum mounted between the side beam and intermediate beam in front of the motor; a gear connection between the intermediate shaft and the main drum; a trip line intermediate shaft in front of the main drum; a gear connection between the trip line intermediate shaft and the main drum shaft; a trip line drum shaft in front of the trip line intermediate shaft; a trip line drum on said trip line shaft; and a gear connection between said trip line drum shaft and the trip line drum.

3. In a logging engine, the combination of a frame having side beams and an intermediate beam; an electric motor arranged between two of the beams having a rotor shaft extension between the other beams; an intermediate shaft parallel with the rotor shaft; a speed changing device mounted on the intermediate shaft between the beams in front of the rotor shaft extension; gears of different diameters connecting the rotor shaft extension with the speed changing device; a main drum mounted between the side beam and intermediate beam in front of the motor; a gear connection between the intermediate shaft and the main drum; a trip line intermediate shaft in front of the main drum; a trip line drum shaft in front of the trip line intermediate shaft; a gear connection between the trip line drum shaft and the trip line intermediate shaft, said gear connection being between the beams in front of the speed changing device; and a trip line drum in front of the main drum on the trip line drum shaft.

4. In a logging engine, the combination of a frame having side beams and an intermediate beam; an electric motor arranged between two of the beams having a rotor shaft extension between the other beams; an intermediate shaft parallel with the rotor shaft; a speed changing device mounted on the intermediate shaft between the beams in front of the rotor shaft extension; gears of different diameters connecting the rotor shaft extension with the speed changing device; a main drum mounted between the side beam and intermediate beam in front of the motor; a gear connection between the intermediate shaft and the main drum; a trip line intermediate shaft in front of the main drum; a trip line drum shaft in front of the trip line intermediate shaft; a gear connection between the trip line drum shaft and the trip line intermediate shaft, said gear connection being between the beams in front of the speed changing device; a trip line drum in front of the main drum on the trip line drum shaft; and an auxiliary drum on the trip line drum shaft in front of the speed changing device.

In testimony whereof I have hereunto set my hand.

HARRY L. TURNEY.